(12) United States Patent
Meyers et al.

(10) Patent No.: US 9,875,081 B2
(45) Date of Patent: Jan. 23, 2018

(54) DEVICE SELECTION FOR PROVIDING A RESPONSE

(71) Applicant: Amazon Technologies, Inc., Seattle, WA (US)

(72) Inventors: James David Meyers, San Jose, CA (US); Shah Samir Pravinchandra, Cupertino, CA (US); Yue Liu, Milpitas, CA (US); Arlen Dean, Mountain View, CA (US); Daniel Miller, Sunnyvale, CA (US); Arindam Mandal, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/860,400

(22) Filed: Sep. 21, 2015

(65) Prior Publication Data

US 2017/0083285 A1    Mar. 23, 2017

(51) Int. Cl.

| | |
|---|---|
| *G10L 15/22* | (2006.01) |
| *G10L 15/00* | (2013.01) |
| *G06F 3/16* | (2006.01) |
| *G10L 15/26* | (2006.01) |
| *G10L 15/18* | (2013.01) |
| *G10L 15/06* | (2013.01) |
| *G10L 15/32* | (2013.01) |
| *G01L 21/00* | (2006.01) |
| *G10L 15/08* | (2006.01) |

(52) U.S. Cl.
CPC .............. *G06F 3/167* (2013.01); *G10L 15/00* (2013.01); *G10L 15/063* (2013.01); *G10L 15/1815* (2013.01); *G10L 15/22* (2013.01); *G10L 15/222* (2013.01); *G10L 15/26* (2013.01); *G10L 15/32* (2013.01); *G10L 2015/088* (2013.01); *G10L 2015/223* (2013.01); *G10L 2015/226* (2013.01)

(58) Field of Classification Search
None
See application file for complete search history.

(56) References Cited

U.S. PATENT DOCUMENTS

| | | | | |
|---|---|---|---|---|
| 3,770,892 | A * | 11/1973 | Clapper | .................. G10L 15/00 704/221 |
| 4,531,228 | A * | 7/1985 | Noso | ....................... G10L 15/20 704/275 |
| 4,718,092 | A * | 1/1988 | Klovstad | ............... G10L 15/193 704/239 |

(Continued)

OTHER PUBLICATIONS

PCT Search Report and Written Opinion dated Dec. 9, 2016 for PCT Application No. PCT/US16/52688, 9 pages.

*Primary Examiner* — Neeraj Sharma
(74) *Attorney, Agent, or Firm* — Lee & Hayes, PLLC

(57) ABSTRACT

A system may use multiple speech interface devices to interact with a user by speech. All or a portion of the speech interface devices may detect a user utterance and may initiate speech processing to determine a meaning or intent of the utterance. Within the speech processing, arbitration is employed to select one of the multiple speech interface devices to respond to the user utterance. Arbitration may be based in part on metadata that directly or indirectly indicates the proximity of the user to the devices, and the device that is deemed to be nearest the user may be selected to respond to the user utterance.

19 Claims, 9 Drawing Sheets

(56) References Cited

U.S. PATENT DOCUMENTS

| | | | | |
|---|---|---|---|---|
| 5,791,904 A * | 8/1998 | Russell | G09B 19/04 | 434/156 |
| 5,884,249 A * | 3/1999 | Namba | G06F 17/271 | 704/275 |
| 6,009,396 A * | 12/1999 | Nagata | G10L 15/26 | 381/92 |
| 6,092,045 A * | 7/2000 | Stubley | G10L 15/285 | 704/254 |
| 6,219,645 B1 * | 4/2001 | Byers | G10L 15/02 | 381/91 |
| 6,314,393 B1 * | 11/2001 | Zheng | G10L 19/12 | 370/216 |
| 6,453,290 B1 * | 9/2002 | Jochumson | G09B 19/04 | 434/185 |
| 6,591,239 B1 * | 7/2003 | McCall | G06F 19/3406 | 340/3.5 |
| 6,594,630 B1 * | 7/2003 | Zlokarnik | G10L 15/26 | 704/241 |
| 6,725,193 B1 * | 4/2004 | Makovicka | G10L 21/02 | 704/233 |
| 7,319,959 B1 * | 1/2008 | Watts | G10L 15/02 | 704/205 |
| 8,340,975 B1 | 12/2012 | Rosenberger | | |
| 8,600,746 B1 * | 12/2013 | Lei | G10L 15/22 | 704/235 |
| 8,625,819 B2 | 1/2014 | Goldstein | H04R 25/02 | 381/110 |
| 9,020,823 B2 * | 4/2015 | Hoepken | G10L 15/22 | 704/275 |
| 9,293,134 B1 * | 3/2016 | Saleem | G10L 13/00 | |
| 9,336,767 B1 * | 5/2016 | Barton | G10K 11/16 | |
| 2001/0047265 A1 * | 11/2001 | Sepe, Jr. | G10L 15/22 | 704/275 |
| 2002/0077772 A1 * | 6/2002 | Squibbs | G06F 3/011 | 702/159 |
| 2002/0193989 A1 * | 12/2002 | Geilhufe | G10L 15/26 | 704/208 |
| 2003/0138116 A1 * | 7/2003 | Jones | H04R 3/005 | 381/94.1 |
| 2005/0049859 A1 * | 3/2005 | Arun | G10L 15/22 | 704/231 |
| 2006/0095258 A1 * | 5/2006 | Jeong | G06K 9/624 | 704/233 |
| 2009/0015651 A1 * | 1/2009 | Togami | G10L 21/00 | 348/14.01 |
| 2009/0018831 A1 * | 1/2009 | Morita | G10L 15/24 | 704/246 |
| 2009/0164212 A1 * | 6/2009 | Chan | G10L 21/0208 | 704/226 |
| 2009/0299752 A1 * | 12/2009 | Rodriguez | D06F 17/30743 | 704/275 |
| 2009/0306981 A1 * | 12/2009 | Cromack | G06F 17/30743 | 704/235 |
| 2010/0004930 A1 * | 1/2010 | Strope | G10L 15/32 | 704/240 |
| 2010/0211387 A1 * | 8/2010 | Chen | G10L 25/78 | 704/226 |
| 2011/0093261 A1 | 4/2011 | Angott | | |
| 2011/0182481 A1 * | 7/2011 | Dernis | G06K 9/00892 | 382/116 |
| 2011/0184740 A1 * | 7/2011 | Gruenstein | G10L 15/32 | 704/275 |
| 2012/0120218 A1 * | 5/2012 | Flaks | G10L 21/028 | 348/77 |
| 2012/0179471 A1 * | 7/2012 | Newman | G10L 15/30 | 704/270.1 |
| 2013/0024196 A1 * | 1/2013 | Ganong | G10L 17/00 | 704/246 |
| 2013/0029684 A1 * | 1/2013 | Kawaguchi | H04R 3/005 | 455/456.1 |
| 2013/0080169 A1 * | 3/2013 | Harada | G10L 25/63 | 704/249 |
| 2013/0132089 A1 * | 5/2013 | Fanty | G10L 21/00 | 704/270 |
| 2013/0289996 A1 * | 10/2013 | Fry | G10L 15/32 | 704/257 |
| 2013/0301837 A1 * | 11/2013 | Kim | H04N 7/15 | 381/56 |
| 2014/0058732 A1 * | 2/2014 | Labsky | G10L 15/30 | 704/254 |
| 2014/0074483 A1 * | 3/2014 | van Os | G10L 15/22 | 704/275 |
| 2014/0088952 A1 * | 3/2014 | Fife | G06F 17/27 | 704/9 |
| 2014/0095172 A1 * | 4/2014 | Cabaco | G10L 21/06 | 704/275 |
| 2014/0142929 A1 * | 5/2014 | Seide | G06N 3/08 | 704/202 |
| 2014/0184840 A1 * | 7/2014 | Konicek | G03B 17/02 | 348/211.1 |
| 2014/0274212 A1 * | 9/2014 | Zurek | H04M 1/6041 | 455/563 |
| 2014/0278389 A1 * | 9/2014 | Zurek | G10L 15/20 | 704/231 |
| 2014/0278437 A1 * | 9/2014 | Shen | G10L 21/06 | 704/275 |
| 2014/0289323 A1 * | 9/2014 | Kutaragi | G06Q 50/01 | 709/203 |
| 2015/0006176 A1 | 1/2015 | Pogue et al. | | |
| 2015/0032456 A1 | 1/2015 | Wait | | |
| 2015/0046157 A1 * | 2/2015 | Wolff | G10L 15/22 | 704/231 |
| 2015/0088518 A1 * | 3/2015 | Kim | G06F 3/167 | 704/251 |
| 2015/0095026 A1 | 4/2015 | Bisani | | |
| 2015/0106085 A1 * | 4/2015 | Lindahl | G10L 15/32 | 704/231 |
| 2015/0133109 A1 * | 5/2015 | Freeman | H04M 1/72522 | 455/420 |
| 2015/0154976 A1 | 6/2015 | Mutagi | | |
| 2015/0206544 A1 * | 7/2015 | Carter | G10L 25/78 | 704/235 |
| 2015/0228274 A1 * | 8/2015 | Leppanen | G10L 15/20 | 704/243 |
| 2015/0331658 A1 * | 11/2015 | Domingo Yaguez | G10L 15/22 | 704/251 |
| 2015/0371637 A1 * | 12/2015 | Neubacher | G10L 15/26 | 704/235 |
| 2015/0382047 A1 * | 12/2015 | Van Os | G10L 15/22 | 725/38 |
| 2016/0063997 A1 * | 3/2016 | Nemala | G10L 15/20 | 704/233 |
| 2016/0077574 A1 * | 3/2016 | Bansal | G06F 1/3215 | 704/275 |
| 2016/0150575 A1 * | 5/2016 | Andersen | H04W 76/02 | 370/329 |
| 2016/0180853 A1 * | 6/2016 | Vanlund | G10L 17/22 | 704/275 |

* cited by examiner

DEVICE SELECTION FOR PROVIDING A RESPONSE

BACKGROUND

As the processing power available to devices and associated support services continues to increase, it has become practical to interact with users in new ways. In particular, it is becoming practical to interact with users through speech. Many devices are now capable of receiving and responding to voice commands, including personal computers, smartphones, tablet devices, media devices, entertainment devices, industrial systems, voice-based assistants, and so forth. Described herein are technological solutions to problems faced when expanding these systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
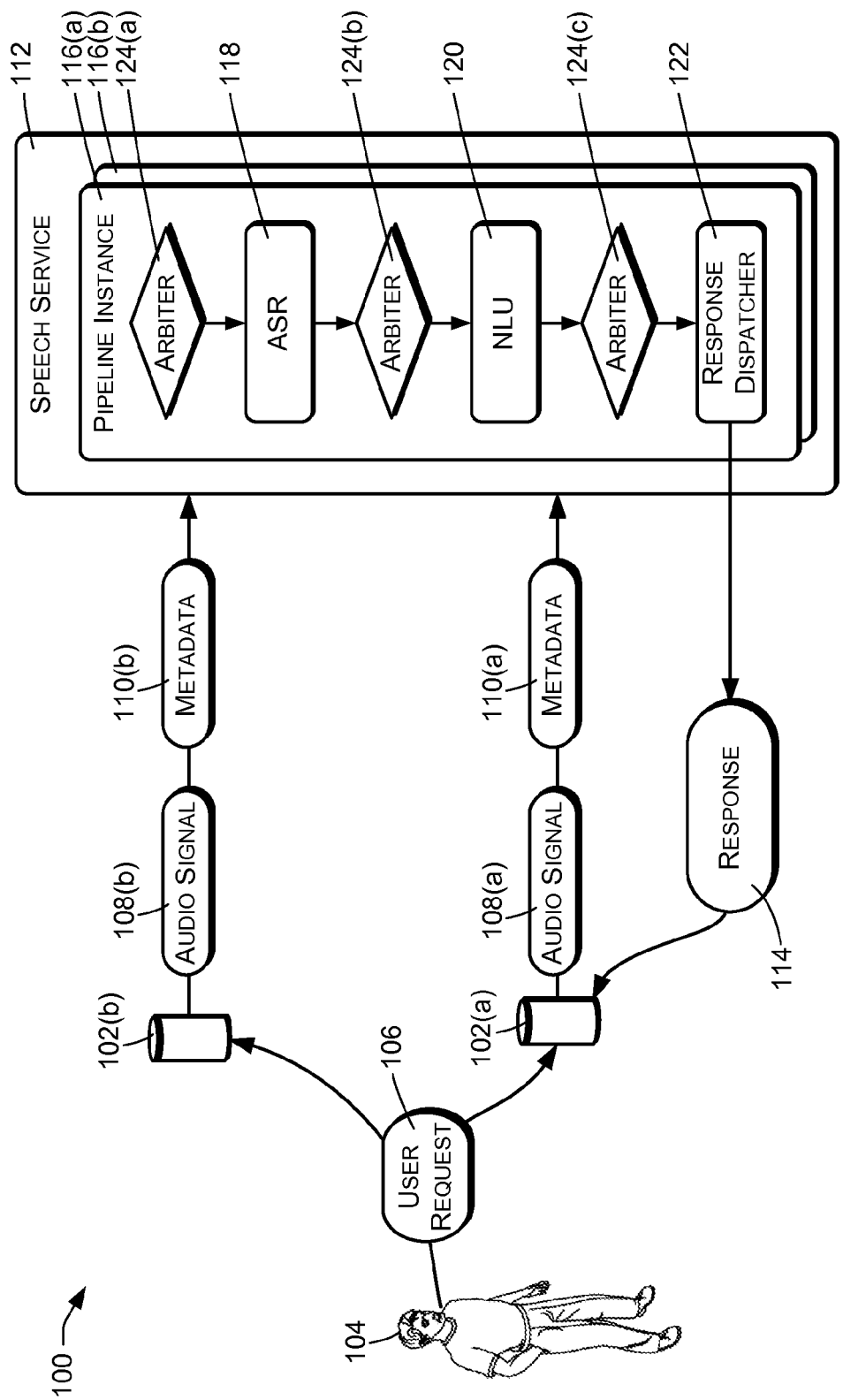
FIG. 1 is a block diagram illustrating an example speech-based system that receives user utterances from multiple speech interface devices.

A speech-based system may be configured to interact with a user by speech to receive instructions from the user and to provide services for the user. In certain embodiments, the system may comprise multiple speech interface devices placed at different locations within a room, a house, or another environment. Each speech interface device has a microphone for receiving user speech and, in some embodiments, may work with an integrated or associated loudspeaker for playing responsive system speech.

Certain functions and capabilities of each device may be provided at least in part by a network-based service, which the device may access through a data communications network, including the Internet. In particular, the network-based service may provide speech processing and interaction capabilities for the device, including automatic speech recognition (ASR), natural language understanding (NLU), response generation, and text-to-speech (TTS) functionality. Upon determining an intent expressed by user speech, the network-based service performs functions and/or produces audio using the speech interface device.

In certain embodiments, the speech interface device may include both a microphone and a loudspeaker. In other embodiments, the speech interface device may comprise a microphone for receiving user speech, with responsive system-generated speech being provided by a speaker device. Such a speaker device may be under the control of the speech interface device and may play audio provided by the speech interface device. Alternatively, the speaker device may receive responsive speech audio from the network-based service.

In situations in which multiple speech interface devices are near each other, such as within a single room or in adjoining rooms, each of the speech interface devices may receive a user utterance and each device may independently attempt to process and respond to the user utterance as if it were two separate utterances. The following disclosure relates to techniques for avoiding such duplicate efforts and responses, among other things.

In the described embodiments, each speech interface device detects that a user is speaking a command and streams an audio signal representing the spoken command to a network-based speech service. The network-based speech service receives the audio signal, performs ASR and NLU to determine the intent expressed by the command, and provides a response to one of the speech interface devices. For example, the response may comprise generating data representing words that are to be produced as sound by the speech interface device in response to the user command. As another example, the response may comprise an instruction for the speech interface to start playing music or to perform another function.

When receiving audio signals from multiple speech interface devices within a home, the system selects one of the devices that is to respond to the user command (e.g., provide an audible response or otherwise act in response to the user command). The selection may be made based on metadata associated with the audio signals. As one example, the system may attempt to determine the proximity of the user to the different speech interface devices and to select the speech interface device that is nearest the user. Proximity may include temporal and physical proximity, and may be indicated by metadata attributes such as audio signal amplitude, levels of voice presence detected in the audio signals, relative times at which user speech was detected by the speech interface devices, and other attributes that may be produced or provided by the speech interface devices. For example, a higher audio signal amplitude at a first speech interface device relative to second speech interface device may indicate that a user is nearer to the first speech interface device than to the second speech interface device. As another example, the speech interface device that first detects or recognizes user speech may be the device that is nearest the user.

Proximity may also be indicated by attributes produced by the network-based speech service, such as ASR and NLU confidence levels. In some cases, a proximity score may be created based on numerous attributes, and proximity scores corresponding to the different audio signals may be compared to select the audio signal having the highest metadata score.

In some cases, a selection of which of multiple speech processing devices will respond to received user speech may be made based on the context within which a command is spoken. For example, a newly received command may relate to the same subject as a previous command for which a particular speech interface device responded, and the same speech interface device may therefore be selected to respond to the newly received command. As another example, the most recently active speech interface device may be selected to provide an action or speech in response to a user command. As yet another example, in the case that one of the speech interface devices has capabilities for providing an appropriate response to a speech command and another of the devices does not, the device having the capabilities may be selected for providing the response. As yet another example, the speech command may relate to an activity that one of the speech interface devices is currently performing, and that speech interface device may therefore be selected to act upon or respond to the speech command. In some cases, it may happen that a first device is performing an activity in response to a previous user command and that a new command modifying that activity is detected by second device. In this case, the network-based speech service may determine that the new command relates to the current activity of the first device and may select the first device to respond to the user command.

In some embodiments, an audio signal representing a speech command may be provided by a first speech interface device and a second speech interface device may fail to detect or send the speech command, even though the command may be related to an activity that the second speech interface device is currently performing. For example, the second device may be playing music when the first device receives the command "stop." The system may determine that the command received by the first device relates to the activity being performed by the second device, and may direct a response to the second device rather than to the first device. In this example, the "stop" command is directed to the second device, and the second device responds by stopping the playback of music.

FIG. 1 shows an example system 100 that provides services based on spoken commands. The system has multiple speech interface devices 102. The speech interface devices 102 will be referred herein simply as devices 102. For purposes of discussion, two devices 102(a) and 102(b) are shown, although the system 100 may include more than two devices 102. Each device 102 has one or more microphones that are used to capture user speech as well as one or more speakers that are used to play speech and content. In some embodiments, the devices 102 may be designed to operate from a fixed location. In other embodiments, the devices 102 may be portable. For example, the devices 102 may comprise handheld devices or other mobile devices, such as smartphones, tablet computers, media players, personal computers, wearable devices, various types of accessories, and so forth.

A user 104 is shown as interacting with the system 100 through the devices 102. The devices 102 may be located near enough to each other so that both of the devices 102 may detect an utterance of the user 104.

In certain embodiments, the primary mode of user interaction with the speech interface device 102 may be through speech. For example, the speech interface device 102 may receive spoken commands from the user 104 and provide services in response to the commands. The user 104 may speak a predefined trigger expression (e.g., "Awake"), which may be followed by instructions or directives (e.g., "I'd like to go to a movie. Please tell me what's playing at the local cinema."). Provided services may include performing actions or activities, rendering media, obtaining and/or providing information, providing information via generated or synthesized speech via the speech interface device 102, initiating Internet-based services on behalf of the user 104, and so forth.

Sound corresponding to a spoken user request 106 is received by each of the devices 102. In certain implementations, the user request 106 may be prefaced by a wakeword or other trigger expression that is spoken by the user 104 to indicate that subsequent user speech is intended to be received and acted upon by one of the devices 102. The device 102 may detect the wakeword and interpret subsequent user speech as being directed to the device 102. A wakeword in certain embodiments may be a reserved keyword that is detected locally by the speech interface device 102. Upon detecting the keyword, the speech interface device 102 may begin providing an audio signal to a remote, network-based speech recognition system for detecting and responding to subsequent user utterances.

In certain implementations, each device 102 may have an expression detector that analyzes an audio signal produced by a microphone of the device 102 to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In certain embodiments, an expression detector of an audio device 102 may be configured to analyze the audio signal to produce a score indicating a likelihood that the wakeword is represented in the audio signal. The expression detector then compares the score to a threshold to determine whether the wakeword will be declared as having been spoken.

In some cases, a keyword spotter may use simplified ASR (automatic speech recognition) techniques. For example, an expression detector may use a Hidden Markov Model (HMM) recognizer that performs acoustic modeling of the audio signal and compares the HMM model of the audio signal to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine (SVM) classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression. Upon declaring that the audio signal represents an utterance of the trigger expression, the audio device 102 begins transmitting the audio signal to the remote, network-based speech recognition system for detecting and responding to subsequent user utterances.

Each device 102 receives the user request 106 and produces a corresponding audio signal 108 and associated metadata 110. Specifically, the first speech interface device 102(a) produces a corresponding audio signal 108(a) and associated metadata 110(a), and the second speech interface device 102(b) produces a corresponding audio signal 108(b) and associated metadata 110(b). Each of the audio signals 108(a) and 108(b) represents the same user speech, corresponding to the user request 106.

The metadata 110 may comprise various information that can be used to determine or infer the proximity of the user 104 relative to the respective device 102 and more generally that can be used to determine which of the devices 102 a speech response or other action should be directed to. Proximity in this environment may correspond to either or both of physical proximity and temporal proximity. For example, first metadata 110(a) may include a first timestamp indicating the time at which the user speech 106 was received by the first speech interface device 102(a) and the second metadata 110(b) may include a second timestamp indicating the time at which the user speech 106 was received by the second speech interface device 102(a). The metadata 110 may include other information such as the signal energy of the audio signal 108 and/or a level of voice presence in the audio signal 108 as detected by the speech interface device 102.

The audio signals 108 and associated metadata 110 are provided to a speech service 112 for analysis and responsive action. In some cases, the speech service 112 may be a network-accessible service implemented by multiple server computers that support devices 102 in the homes or other premises of many different users. The devices 102 may communicate with the speech service 112 over a wide-area network such as the Internet. Alternatively, one or more of the devices 102 may include or provide the speech service 112.

The speech service 112 determines, based on the metadata 110 and other metadata that may be produced by the speech service 112 itself, which of the speech interface devices 102 should receive and perform a response 114 to the user request 106. This is done in a way that reflects the likely intent of the user 104 to speak to a particular one of the speech interface devices 102. Various techniques will described below for determining which of the devices 102 the user 104 most likely wants to respond to the user request 106.

Generally, the speech service 112 works by first determining whether the audio signals received from the devices 102 represent the same utterance, which can be performed by comparing the times at which the devices 102 received the user speech. If the audio signals do represent the same utterance, such as may be deemed to be the case when the times at which the devices 102 received the user speech are in close temporal proximity to each other, arbitration is performed to determine which of the devices 102 should be used to provide a response to the user request represented by the audio signals.

The speech service 112 is configured to process the audio signals 108(a) and 108(b) using respective speech processing pipeline instances 116(a) and 116(b). Each pipeline instance 116 corresponds to one of the devices 102 and to the signal 108 provided by the pipeline instance. In the illustrated example, the first speech processing pipeline instance 116(a) corresponds to the first device 102(a) and to the corresponding first audio signal 108(a). The second speech processing pipeline instance 116(b) corresponds to the second device 102(b) and to the corresponding second audio signal 108(b).

Each speech processing pipeline instance 116 has an ordered series of pipeline processing components configured to process the received audio signal 108. The first speech processing pipeline instance 116(a) processes the first audio signal 108(a) and corresponding first metadata 110(a), which are received from the first device 102(a). The second speech processing pipeline instance 116(b) receives and processes the second audio signal 108(b) and corresponding second metadata 110(b), which are received from the second device 102(b). Each pipeline instance 116 may be implemented by a different server of the speech service 112.

The processing components of each speech processing pipeline instance 116 comprise an automatic speech recognition (ASR) component 118 configured to analyze the received audio signal 108 to determine words of the spoken user request 106. The processing components also comprise a natural language understanding (NLU) component 120 positioned in the pipeline instance after the ASR component 118. The NLU component 120 is configured to analyze the words of the user request 106 produced by the ASR component 118 to determine an intent expressed by the user request 106. The processing components also comprise a response dispatcher 122 positioned in the pipeline instance after the NLU component 120. The response dispatcher 122 is configured to determine and specify a speech response or other action corresponding to the intent of the user request 106 based on the intent determined by the NLU component 120, and to provide the response to the corresponding device 102 or instruct the corresponding device 102 to perform an action in response to the user request 106.

Each pipeline instance 116 receives an audio signal 108 from a corresponding device 102 and, unless the pipeline instance is aborted as described below, provides a response 114 to the same device 102. In operation, all but one of the pipeline instances 116 are aborted before completion so that only a single one of the pipeline instances 116 returns a response 114 to its corresponding device 102.

The processing components of each pipeline instance 116 comprise a first source arbiter 124(a) positioned in the pipeline instance 116 before the ASR component 118, a second source arbiter 124(b) positioned in the pipeline instance 116 after the ASR component 118 and before the NLU component 120, and a third source arbiter 124(c) positioned in the pipeline instance 116 after the NLU component 120 and before the response dispatcher 122. More specifically, the first source arbiter 124(a) is positioned in the pipeline instance 116 so that it is invoked at a time prior to initiation of ASR, and so that the ASR component is initiated as a result of the first source arbiter 124(a) producing an output. The second source arbiter 124(b) is positioned in the pipeline instance 116 so that it is invoked at a time subsequent to completion of the ASR and prior to initiation of NLU. Accordingly, the second source arbiter 124(b) is initiated based on the the ASR component 118 producing an output and the NLU component 120 is initiated based on the second source arbiter 124(b) producing an output. The third source arbiter 124(c) is positioned in the pipeline instance 116 so that it is invoked at a time subsequent to completion of NLU and before invocation of the response dispatcher 122. Accordingly, the third source arbiter 124(c) is initiated based on the NLU component 120 producing an output and the response dispatcher 122 is initiated based on the third source arbiter 124(c) producing an output.

Each source arbiter 124 is configured to determine whether one or more criteria are satisfied, wherein the criteria relate to and indicate whether the device 102 corresponding to the pipeline instance 116 should or will be the device that is used to provide a response to the user request 106. The criteria may be based at least in part on the metadata 110 received from the corresponding device 102. Although three arbiters are shown and discussed in connection with some embodiments herein, other embodiments may include one, two or more arbiters and/or other devices that function similar to or provide a subset of the functionality discussed in connection with source arbiter 124(*a*), 124(*b*) and/or 124(*c*).

As one example, the first metadata 110(*a*) may comprise a first timestamp corresponding to the time that the user request 106 was received by the first device 102(*a*) and the second metadata 110(*b*) may comprise a second timestamp corresponding to the time that the user request 106 was received by the second device 102(*b*). Each arbiter 124 of the first pipeline instance 116(*a*) may be configured to abort the pipeline instance 116(*a*) in response to (a) determining that the difference between the first timestamp and the second timestamp is less than a threshold, indicating that the sound representing the user request 106 was received by each of the devices 102(*a*) and 102(*b*) at close to the same time, and (b) determining that the first timestamp is greater than the second timestamp, indicating that the first device 102(*a*) received or detected the user utterance later than the second device 102(*b*). Note that in these examples the timestamp may correspond to the time at which a prefacing wakeword was detected by the respective device 102.

As another example, the metadata 110 may comprise one or more signal attributes. For example, a signal attribute may indicate the amplitude of the audio signal, the signal-to-noise ratio of the audio signal, the level of voice presence detected in the audio signal, the confidence level with which a wakeword was detected in the audio signal, the physical distance of the user 104 from the device 102, and so forth. Each arbiter 124 of the first pipeline instance 116(*a*) may be configured to compare attributes regarding the first audio signal 108(*a*) with corresponding attributes of the second audio signal 108(*b*) and to abort the first pipeline instance 116(*a*) as a result of a negative comparison. For example, the first pipeline instance 116(*a*) may be aborted if the first audio signal 108(*a*) has a lower amplitude than that of the second audio signal 108(*b*). Similarly, the first pipeline instance 116(*a*) may be aborted if the first audio signal has a lower signal-to-noise ratio, voice presence, wakeword detection confidence level, or user distance than that of the second audio signal 108(*b*).

As specific examples, determining which of first and second audio devices will respond to a user utterance, where the first and second audio devices provide first and second audio signals respectively, may comprise one or more of the following:

determining which of the first audio signal and the second audio signal has a higher strength or amplitude;

determining which of the first device and the second device detects a higher level of voice presence or which of the first audio signal and the second audio signal represents a higher level of voice presence;

determining which of the first audio signal and the second audio signal has a higher signal-to-noise measurement;

determining which of the first device and the second device detects a trigger expression with a higher level of confidence;

determining which of the first device and the second device first detects the trigger expression;

determining which of the first device and the second device has a particular capability;

determining within which of the first audio signal and the second audio signal words are recognized with a higher level of confidence;

determining within which of the first audio signal and the second audio signal an intent expressed by the words is determined with a higher level of confidence;

determining which of the first device and the second device is physically nearer a user;

determining which of the first device and the second device first receives a response to an utterance; or determining which of the first and second devices first receives the utterance.

More generally, each of the source arbiters 124 may abort its pipeline instance 116 upon determining that the device 102 associated with the pipeline instance 116 is not the one to which a response should be provided. When operation of a processing pipeline instance is aborted, the aborted pipeline instance does not provide a response 114 to the corresponding device 102. The aborted pipeline instance may also provide an message to the device 102, indicating that the device 102 will not be used to provide a response to the user request. In response, the device may stop providing the audio signal 108 to the speech service 112. As an example, the message or other indication may comprise data including an instruction that causes or results in the device entering a listening mode. A listening mode is a mode in which the device is not sending the audio signal 108 to the speech service 112 and in which the device monitors its environment to detect a further utterance of the wakeword. In some cases, an error response may be returned to the device 102 corresponding to the aborted pipeline instance. In some cases, the device may be instructed to play a tone, produce an LED illumination, or take some other action indicating that the device is not going to respond to the user request.

The speech service 112 may support speech interface devices 102 in the homes of many different users. It is assumed in this description that the user 104 has provided configuration information indicating a group of devices 102 that are associated with each other and that are to be handled collectively in the manner described herein. For example, the user 104 may register each of his or her devices 102, or a set of such devices that are commonly located, as being associated with a single user or household account. More specifically, a user may maintain an account with a network-based service provider that provides the speech service 112 and that supports the operations of many different speech interface devices. An account may be configured to store information for multiple user profiles, corresponding to different members of a household. Each user profile may indicate characteristics and preferences of a particular user. A user or household may register many different types of devices as being associated with an account. The account may be configured to store payment information, purchase information, subscriptions, contact information, etc. The account may also be configured to store information about speech interface devices within a household, such as their locations, their associated profiles, etc.

The actions described herein are performed with respect to a group of devices 102 that have been associated with each other in a manner such as this. Furthermore, although the description herein is given in the context of two devices 102, any number of two or more devices 102 may be used and handled in the same manner.

The speech service 112 may be part of one or more network-accessible computing platforms that are maintained and accessible via the Internet, such as are sometimes referred to as "cloud" services. Generally, communications between the speech interface device 102 and the speech service 112 may be implemented through a combination of various types of data communications networks, including local-area networks, wide-area networks, and/or the public Internet, which may include various types of wireless networks including Wi-Fi networks, Bluetooth networks, and cellular communication networks.

Figure 2:
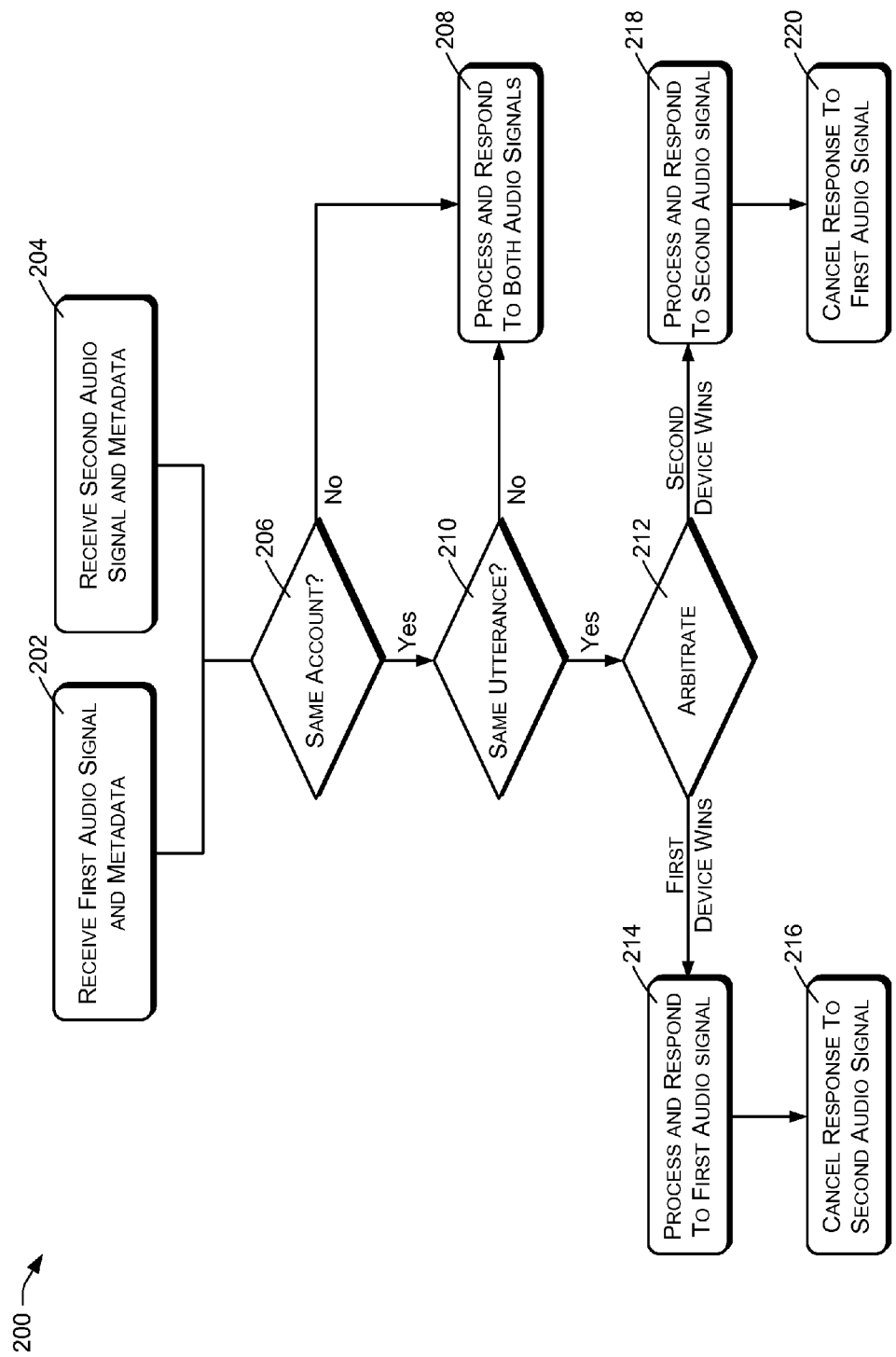
FIG. 2 is a flow diagram illustrating an example method of processing multiple audio signals from multiple speech interface devices.

FIG. 2 shows an example method 200 of providing a response to an utterance such as the user request 106, in an environment in which multiple speech interface devices 102 may attempt to process and respond to the same user utterance. The actions of FIG. 2 may be implemented collectively by one or more servers and/or one or more speech processing pipeline instances 116 of a network service that provides support for the devices 102, such as the speech service 112 illustrated in FIG. 1.

An action 202 comprises receiving the first audio signal 108(a) produced by the first device 102(a), wherein the first audio signal 108(a) represents a first user utterance. The action 202 also comprises receiving first metadata 110(a) associated with the first audio signal 108(a). In the context of FIG. 1, the first audio signal 108(a) and first metadata 110(a) may be received by the first processing pipeline instance 116(a). The metadata 110 may comprise various attributes as described above, which may relate to the corresponding audio signals, to the device that is providing the audio signals, and/or to the user 104.

An action 204 comprises receiving the second audio signal 108(b) produced by the second device 102(b), wherein the second audio signal 108(b) represents a second user utterance. The action 204 also comprises receiving second metadata 110(b) associated with the second audio signal 108(b). In the context of FIG. 1, the second audio signal 108(b) and second metadata 110(b) may be received by the second processing pipeline instance 116(b). The first processing pipeline instance 116(a) and the second processing pipeline instance 116(b) may be implemented by different servers of the speech service 112. That is, each of the devices 102 may communicate with and receive support from a different server of the speech service 112.

In certain embodiments, the first metadata 110(a) may comprise a first timestamp indicating a first time at which the user utterance was received or a first time at which a wakeword preceding the user utterance was received. Similarly, the metadata 110(b) may comprise a second timestamp indicating a second time at which the user utterance was received or a second time at which a wakeword preceding the user utterance was received.

An action 206 comprises determining whether the first and second devices 102(a) and 102(b), from which the first and second audio signals 108(a) and 108(b) have been received, are associated with the same user or household account. If not, an action 208 is performed of processing and responding to both of the audio signals 108(a) and 108(b), wherein each of the devices 102(a) and 102(b) is used to provide a speech response or other action in response to its respectively received user utterance.

If the first and second devices 102(a) and 102(b) are associated with the same user or household account, an action 210 is performed. The action 210, which may be performed at multiple times within the processing pipeline instances corresponding to either or both of the devices 102(a) and 102(b), comprises determining whether the first and second audio signals represent the same user utterance. In some embodiments, this may be determined by comparing the first and second timestamps associated with the first and second audio signals, respectively. More specifically, the difference between the first and second timestamps may be calculated and compared to a threshold. If the difference is less than the threshold, the first and second audio signals are declared to represent the same utterance. If the difference is above the threshold, the first and second audio signals are declared to represent different utterances.

The action 210 may also use other criteria to determine whether the first and second audio signals 108(a) and 108(b) represent the same utterance. For example, the audio signals may be compared to each other to determine whether they are similar to each other. Specifically, the action 210 may comprise calculating a cross-correlation between the first and second audio signals 108(a) and 108(b). If there is a strong correlation between the signals, specifically if the cross-correlation exceeds a predetermined threshold, the signals are declared to represent the same utterance. As another example, ASR results with respect to the first and second audio signals 108(a) and 108(b) may be compared to determine if the audio signals represent matching sequences of words. If the ASR results for the two audio signals are identical or similar, the two audio signals may be considered to represent the same utterance. As yet another example, NLU results with respect to the first and second audio signals 108(a) and 108(b) may be compared to each other. If the NLU results indicate that the speech corresponding to the first and second audio signals 108(a) and 108(b) represent a common intent, the two audio signals may be considered to represent the same utterance.

The action 210 may use more than one of the criteria described. For example, the audio signals may be required to satisfy two or more of the criteria in order to be declared as representing the same user utterance. Furthermore, signals having associated timestamps that vary by more than a predetermined amount may be considered to represent two different user utterances, regardless of any other similarities of the signals, of ASR results regarding the signals, or of NLU results regarding the signals.

If the action 210 determines that the first and second audio signals 108(a) and 108(b) do not represent the same user utterance, an action 208 is performed of processing and responding to both of the audio signals, wherein each of the devices 102(a) and 102(b) is used to provide a speech response or other action in response to its respectively received user utterance.

If the action 210 determines that the first and second audio signals 108(a) and 108(b) do represent the same user utterance, an action 212 is performed of arbitrating between the corresponding devices 102(a) and 102(b) to determine which of the devices will provide a response to the single user utterance that was detected and provided by both of the devices 102(a) and 102(b). The action 212 may comprise comparing attributes indicated by the metadata 110 for each of the audio signals 108. The device whose audio signal 108 has the strongest set of attributes is selected as the winner of the arbitration.

If the first device 102(a) wins the arbitration, an action 214 is performed of processing and responding to the first audio signal 108(a), including producing an appropriate response by the first device 102(a) to the user command represented by the first audio signal 108(a). An action 216 comprises canceling the processing of the second audio signal 108(b) and canceling any response that might otherwise have been provided based on the second audio signal 108(b), including any response that might have otherwise been given by the device 102(b). In some implementations, a message is sent to the device 102(b) informing the device 102(b) not to expect a further response from the speech service 112. Note that the actions 214 and 216 may be performed in parallel or in a different order than illustrated. For example, the action 216 may be performed before the action 214.

If the second device 102(*b*) wins the arbitration, an action 218 is performed of processing and responding to the second audio signal 108(*b*), including producing an appropriate response by the second device 102(*b*) to the user command represented by the second audio signal 108(*b*). An action 220 comprises canceling the processing of the first audio signal 108(*a*) and canceling any response that might otherwise have been provided based on the first audio signal 108(*a*), including any response that might have otherwise been given by the first device 102(*a*). In some implementations, a message may be sent to the device 102(*a*) informing the device 102(*a*) not to expect a further response from the speech service 112. Note that the actions 218 and 220 may be performed in parallel or in a different order than illustrated. For example, the action 220 may be performed before the action 218.

The arbitration action 212 may be performed based at least in part on the first and second metadata 110(*a*) and 110(*b*), which may comprise one or more attributes relating to the first and second audio signals 108(*a*) and 108(*b*) respectively. The metadata 110 may, in addition to the timestamp mentioned above, indicate a proximity of the user 104 relative to the corresponding device 102. For example, the device 102 may have capabilities for performing sound source localization (SSL) based on microphone signals produced by spatially separated microphone elements of a microphone array. SSL may be implemented so as to determine the distance of the user 104 based on received sound corresponding to speech of the user 104. The arbitration action 212 may comprise determining which of the devices 102(*a*) and 102(*b*) is physically or acoustically nearest the user 104 and selecting the nearest device to provide a response to the user request 106.

Alternatively, each device 102 may provide other metadata that may be used as a proxy for an actual distance measurement of the user relative to the device. For example, the metadata 110 associated with an audio signal 108 may comprise the amplitude of the audio signal 108, and the action 212 may comprise selecting the device 102 producing the audio signal 108 having the highest amplitude. The metadata 110 may comprise or may indicate the level of human voice presence detected in the audio signal 108, and the action 212 may comprise selecting the device 102 producing the audio signal 108 having the highest level of detected voice presence. Similarly, the metadata may comprise or may indicate a signal-to-noise ratio of the audio signal 108 and the action 212 may comprise selecting the device 102 providing the audio signal 108 having the highest signal-to-noise ratio. As another example, the metadata 110 may comprise or indicate the level of confidence with which a wakeword or other trigger expression was detected by the device 102, and the action 212 may comprise selecting the device 102 that detected the trigger expression with the highest level of confidence. As yet another example, the metadata 110 may comprise a timestamp indicating the time that the trigger expression was detected by the device 102 that is providing the audio signal, and the action 212 may comprise selecting the device 102 producing the audio signal associated with the earliest timestamp.

In certain embodiments, the metadata may indicate a special capability of the device that provided the audio signal, such as a specialized capability that not all the devices have, and the action 212 may comprise selecting one of the devices 102 that is capable of responding to the user request 106. For example, the first device 102(*a*) may be capable of playing video while the second device 102(*b*) is not. In response to a user request to play video, the action 212 may select the first device 102(*a*) because the second device 102(*b*) does not support the requested action or activity.

The metadata 110 may in some cases indicate a specific user designation of one of the devices 102 that should respond to the user request 106. For example, the user request itself may verbally identify one of the devices 102, or the user may have previously configured the devices to have relative priorities, so that one of the devices 102 is used for responding to user requests. The action 212 in this case may comprise selecting the device that the user has designated to respond to the user request 106.

The action 212, as another example, may be based in part on which of the devices 102 first receives the response 114 to the user request 106, whereby the device 102 that first receives the response 114 is selected to indicate or implement the response 114 while the other device ignores or cancels the response that it receives.

The metadata 110 may indicate a time at which the corresponding device 102 was last active. A device 102 may be considered to be active when it provides a speech response, plays music, provides a notification, performs an action, etc. The action 212 in this case may comprise selecting the device that has most recently been active.

In some cases, the action 212 may comprise determining that a new user utterance is a request that relates to a previous user utterance to which one of the devices 102 responded, and selecting the same device 102 to respond to the new user utterance. For example, the previous user utterance may have been a request for a weather report, to which the first device 102(*a*) responded. The new user utterance may be a more specific request regarding weather, such as a request for a 5-day forecast. Because the previous related request was responded to by the first device 102(*a*), the action 208 may also select the first device 102(*a*) to respond to the related new request.

In some cases, the action 208 may comprise determining that the user request 106 relates to an activity that is currently being performed by one of the devices 102 and selecting the same device 102 to respond to the request 106. For example, the first device 102(*a*) may be playing music and the user request may comprise a "stop" command. The user request can be interpreted as relating to current activity of the first device 102(*a*), and the first device 102(*a*) is therefore selected as the device that should respond to the "stop" request.

In some implementations, the action 212 may also be based on other metadata, such as metadata produced within each processing pipeline instance 116. For example, the ASR component 118 of a pipeline instance 116 may produce an ASR confidence score or level with respect to the ASR results. The action 212 may comprise selecting the device 102 for which the highest ASR confidence level was produced. Similarly, the NLU component 120 may produce an NLU confidence score or level with respect to NLU results. The action 212 may comprise selecting the device 102 for which the highest NLU confidence level was produced.

More generally, the action 212 may be based on multiple criteria involving multiple types of metadata and other information. For example, each criteria may relate to a specific item of metadata, the criteria may be weighted to produce a composite metadata score for each device 102, and the device 102 having the highest metadata score may be selected as the device that is to respond to the user request 106.

With regard to the implementation shown in FIG. 1, each pipeline instance 116 implements several instances of the arbiter 124, wherein each arbiter instance 124 implements actions similar or identical to the actions 210 and 212. However, as each pipeline instance 116 is associated with a single corresponding device 102, the arbiters 124 within an individual pipeline instance 116 determine only whether processing should continue within that pipeline instance and with respect to the corresponding device 102, and do not take any direct action with respect to any of the other pipeline instances 116 or other devices 102. Stated alternatively, each arbiter 124 may act to abort or cancel processing of the pipeline instance within which it is contained, rather than aborting or cancelling processing of any other pipeline instances 116 that might be associated with different devices 102.

The different pipeline instances that process the user request 106 are not typically synchronized with each other. Accordingly, one of the pipeline instances 116 may have progressed through one or more of its components or operations before another of the pipeline instances has been initiated. Similarly, two pipeline instances 116 that are processing a single user request 106 may have been initiated at different times due to different arrival times of the audio signal 108 by the speech service. At any particular time, each of the pipeline instances may have progressed to a different one of its operations.

Within an individual pipeline instance 116, which is associated with a single speech interface device 102, an arbiter 124 makes a continue/abort decision based on information that is currently available. In some cases, it may be that only metadata supplied by the associated device 102 is currently available. In other cases, metadata associated with other devices 102, associated with other pipeline instances 116, may also be available for comparison. Metadata such as confidence scores relating to ASR and NLU may or may not be available at any given time, depending on the progress within each pipeline instance.

Figure 3:
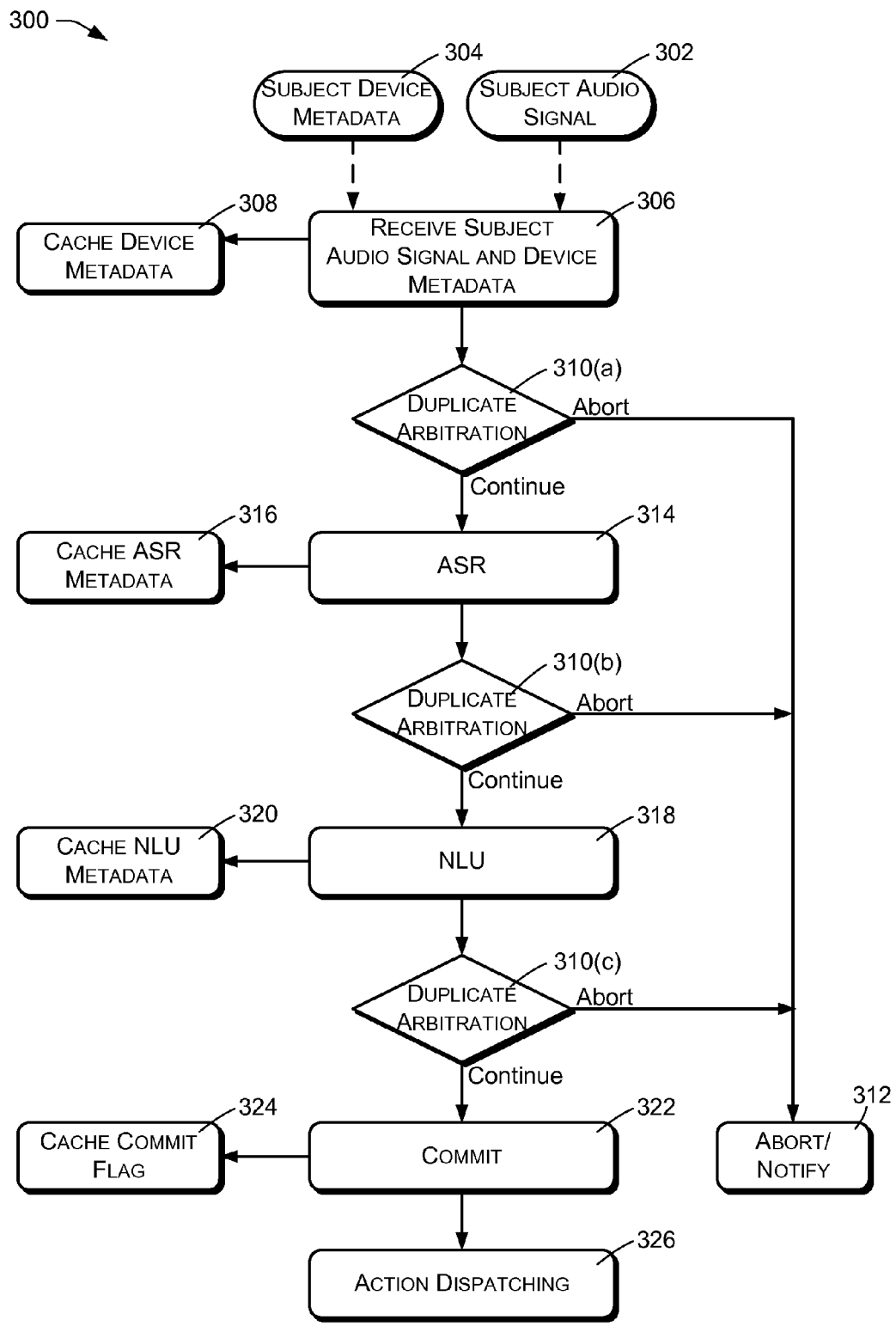
FIG. 3 is a flow diagram illustrating another example method that may be performed by one of the speech interface devices to process a received audio signal.

FIG. 3 shows an example method 300, illustrating a series of actions that may be performed with respect to each of multiple received audio signals 108 provided by respectively corresponding speech interface devices 102. The method 300 is performed by each of the speech processing pipeline instances 116 of FIG. 1. The method 300 is initiated in response to receiving an audio signal 108 from a corresponding speech interface device 102. For purposes of discussion, the audio signal being analyzed by the method 300 will be referred to as the "subject" audio signal 302. Audio signals provided by other devices 102, which are analyzed in parallel by other instances of the method 300, will be referred to as "other" audio signals. Similarly, the metadata associated with the subject audio signal 302 will be referred to as subject device metadata 304. The speech interface device 102 providing the audio subject audio signal 302 will be referred to as the subject device.

An action 306 comprises receiving the subject audio signal 302, which represents a user utterance such as the spoken user request 106. The action 306 also comprises receiving the subject device metadata 304. The subject device metadata 304 may include attributes of the subject audio signal 302 such as signal strength, detected voice level, signal-to-noise ratio, etc., as discussed above with reference to the actions 210 and 212 of FIG. 2. The subject device metadata 304 may include information such as the physical distance of the user 104 from the device 102, a timestamp corresponding to a time at which the user utterance was received or a wakeword was detected, configuration information, connectivity information, etc.

An action 308, performed in response to receiving the subject audio signal 302 and the subject device metadata 304, comprises caching the subject device metadata 304 in a storage location that is accessible to multiple instances of the method 300, such as being accessible to multiple servers and multiple processing pipeline instances 116 of the speech service 112. All instances of the method 300 cache data in a common storage location so that each instance is able to access metadata cached by the other instances.

An action 310(a), also performed in response to receiving the audio signal 302 and the device metadata 304, comprises performing duplicate arbitration. Generally, the similar or identical actions 310(a), 310(b), and 310(c), which are performed at different points in the method 300, comprise evaluating the subject device metadata 304 and other metadata relating to the subject audio signal 302 in comparison to the metadata of other audio signals that has previously been cached by other instances of the method 300. The evaluation is performed in order to determine, as between the subject device and each of the other devices, whether the subject device should respond to the utterance represented by the subject audio signal 302. If not, an action 312 is performed of aborting the pipeline instance corresponding to the subject device, meaning that no further actions of the method 300 are performed with respect to the subject audio signal 302. The action 312 may also comprise notifying the subject device that the pipeline instance has been terminated and that the subject device should not expect a response to the subject audio signal 302. In some cases, the action 312 may also comprise instructing the subject device to stop sending the subject audio signal 302 to the speech service.

Figure 4:
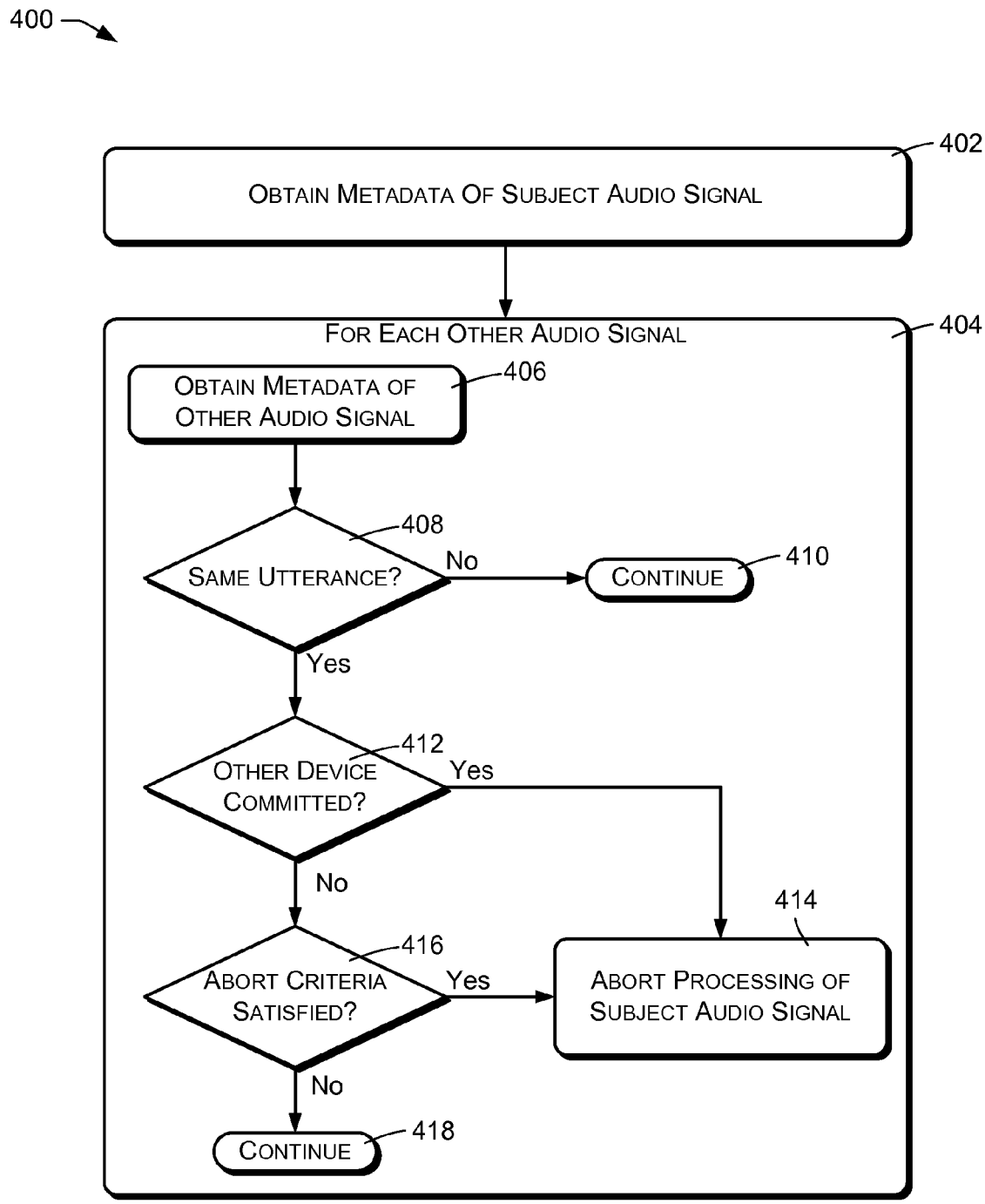
FIG. 4 is a flow diagram illustrating an example method of arbitrating between two speech devices.

FIG. 4 illustrates an example method 400 that may be used to implement the actions 310(a), 310(b), and 310(c). An action 402 of the method 400 comprises obtaining the subject device metadata 304 of the subject audio signal 302. A set of actions 404 are then performed for or with respect to each of the other audio signals for which instances of the method 300 have been initiated.

The actions 404 comprise a program loop that is performed for or with respect to each one of one or more multiple other audio signals, wherein the term "other audio signal" is used to refer to of each multiple audio signals other than the subject audio signal. Each other audio signal is associated with its own metadata and a corresponding device 102 that has generated the other audio signal. An instance of the method 300 has been or will be initiated for each of the other audio signals. The program loop 404 will be described as being performed with respect to a single one of the other audio signals, although as stated it is repeated for each of the other audio signals unless an abort decision is reached.

An action 406 comprises obtaining metadata associated with the other audio signal, such as metadata that has been previously cached by an instance of the method 300 associated with the other audio signal. The metadata of the other audio signal may comprise any of the metadata or information described herein, such as the device metadata 110 and any other metadata produced within the pipeline instance 116 associated with the other audio signal.

An action 408 comprises determining whether the subject audio signal 302 and the other audio signal represent the same user utterance. The action 408 may be performed using the same techniques as described above with reference to the action 210 of FIG. 2. If the two audio signals do not represent the same user utterance, no further action is taken with respect to the other audio signal, and the set of actions 404 is continued as indicated by the block 410 for a different one of the other audio signals.

If the two audio signals do represent the same user utterance, an action 412 is performed. The action 412 comprises determining whether another instance of the method 300 has already committed its associated device 102 to respond to the user utterance. If so, an action 414 is performed of aborting the instance of the method 300 associated with the subject audio signal. Aborting the method 300 means that no further actions are taken with respect to the subject audio signal 302 and that a response is not provided by the subject device. In addition, the loop 404 is terminated.

If another device has not already been committed to respond to the user utterance, an action 416 is performed of determining whether one or more abort criteria are satisfied by the metadata currently available for the subject audio signal and the other audio signal. The abort criteria may comprise relationships between the metadata of the subject audio signal and the other audio signal, as described above with reference to the action 210 of FIG. 2. If the one or more criteria are satisfied, the action 414 is performed of aborting the instance of the method associated with the subject audio signal 302. If the abort criteria are not satisfied, the set of actions 404 is repeated for a different one of the other audio signals as indicated by the block 418.

Returning to FIG. 3, the action 310(*a*) results in a decision to either abort or to continue. If the decision is to abort, processing of the subject audio signal is terminated and the subject device does not provide a response to the user query. The subject device may be instructed to stop sending the subject audio signal 302.

If the decision of the action 310(*a*) is to continue, an action 314 is performed comprising performing automatic speech recognition (ASR) on the subject audio signal 302. The ASR 314 produces a textual representation of the words of any user speech represented by the subject audio signal 302. The ASR may also produce an ASR confidence level indicating the level of confidence with which the words of the user speech were determined. An action 316 comprises caching the ASR confidence level as ASR metadata to be associated with the audio signal 302.

After the ASR 314, an additional duplicate arbitration action 310(*b*) is performed, which may be similar or identical to the action 310(*a*). If the decision of the action 310(*b*) is to abort, processing of the subject audio signal is terminated and the subject device does not provide a response to the user query.

If the decision of the action 310(*b*) is to continue, an action 318 is performed comprising performing natural language understanding (NLU) on the textual representation of words produced by the ASR 314. The action 318 determines a likely intent expressed by user speech and may also produce an NLU confidence level indicating the level of confidence with which the intent was determined. An action 320 comprises caching the NLU confidence level as NLU metadata to be associated with the audio signal 302.

After the NLU 318, yet another duplicate arbitration action 310(*c*) is performed, which may be similar or identical to the actions 310(*a*) and 310(*b*). If the decision of the action 310(*c*) is to abort, processing of the subject audio signal is terminated and the subject device does not provide a response to the user query.

If the decision of the action 310(*c*) is to continue, an action 322 is performed of committing the subject device to respond to the user query. This commitment is made known by performing an action 324 of caching a commitment flag, indicating that the processing of the subject audio signal has progressed to the point where an action is about to be dispatched to the subject device in response to an intent represented by the subject audio signal, and that the processing of other audio signals should be aborted. Other instances of the method 300 may read this flag as they perform the duplication arbitration 310, and may abort themselves based on the existence of this flag. For example, the action 412 of FIG. 4 may be performed by examining this flag.

An action 326 comprises dispatching an action, which may comprise generating and providing a response to the subject device. The action 326 may also comprise performing other actions in response to the determined user request, including providing instructions to the subject device 102 to perform actions besides or in addition to producing speech, such as playing music, stopping music playback, starting a timer, etc.

Figure 5:
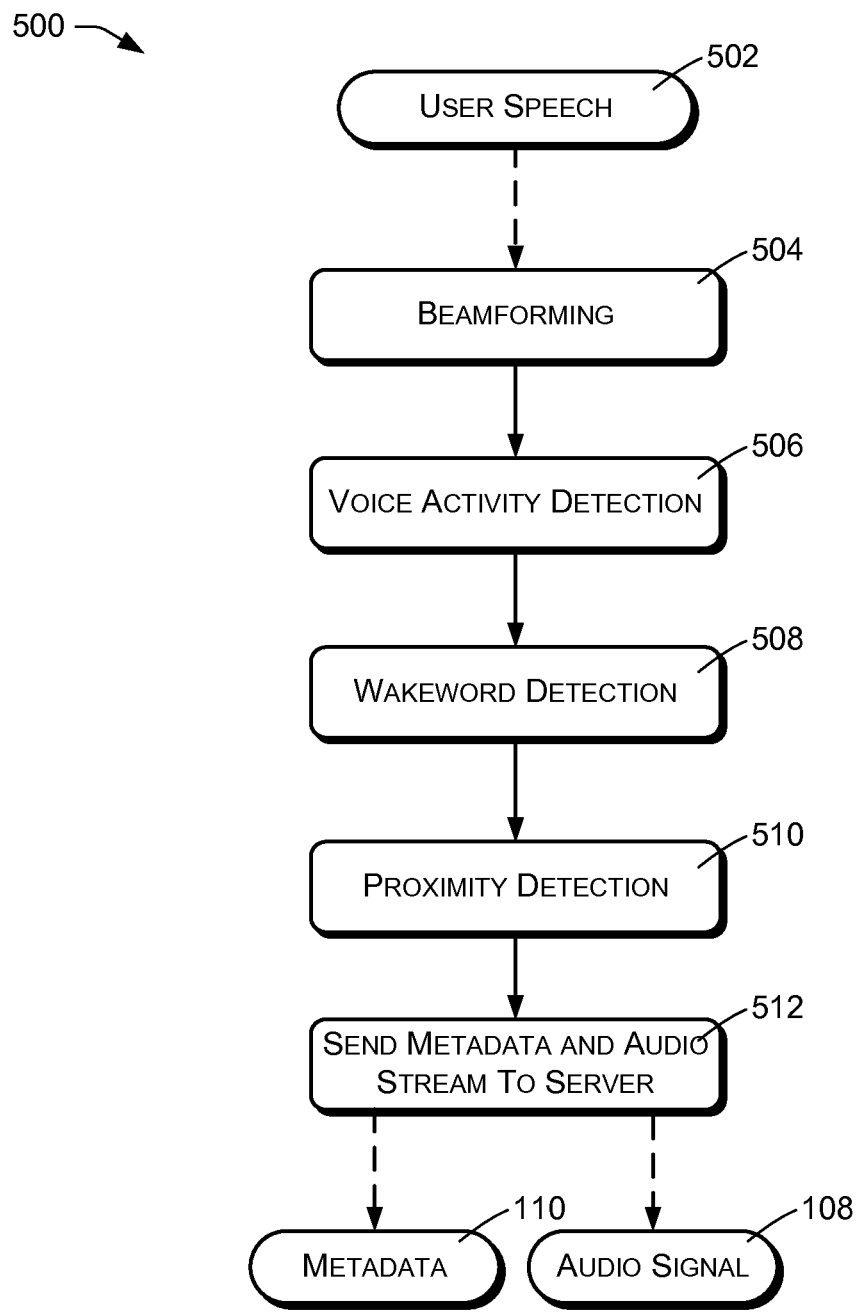
FIG. 5 is a flow diagram illustrating an example method that may be performed by a speech interface device to provide an audio signal and accompanying metadata to a speech service.

FIG. 5 illustrates an example method 500 that may be implemented by each of the devices 102 in order to provide an audio signal 108 and associated metadata 110 to the speech service 112 in response to detected user speech 502, which may correspond to the user request 106.

An action 504 comprises performing audio beamforming to produce multiple directional audio signals, where each directional audio signal emphasizes sound coming from a different direction relative to the device 102. The action 504 may be performed using time-difference-of-arrival (TDOA) techniques, such using pairs of microphones and delaying the signal from one of the microphones by an amount that is equal to the time for sound to travel the distance between the microphones, thereby emphasizing sound sources that are aligned with the two microphones. Different pairs of microphones can be used in this manner to obtain multiple audio signals, each of which correspond to a different direction.

An action 506 comprises performing voice activity detection (VAD) to detect the presence of voice in the directional audio signals. Upon detecting voice presence in one of the directional audio signals, subsequent actions are performed with respect to that directional audio signal. In some embodiments, the subsequent actions of FIG. 5 are performed with respect to the directional audio signal having the highest voice presence.

VAD determines the level of voice presence in an audio signal by analyzing a portion of the audio signal to evaluate features of the audio signal such as signal energy and frequency distribution. The features are quantified and compared to reference features corresponding to reference signals that are known to contain human speech. The comparison produces a score corresponding to the degree of similarity between the features of the audio signal and the reference features. The score is used as an indication of the detected or likely level of speech presence in the audio signal.

The action 508 comprises performing wakeword detection on the directional audio signal within which voice activity has been detected or on the directional audio signal within which the highest level of voice activity has been detected. As mentioned above, a predefined word, expression, or other sound can be used as a signal that the user intends subsequent speech to be received and acted upon by the device 102.

In the described embodiment, the wakeword detection may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR (automatic speech recognition) techniques. For example, wakeword detection may use a Hidden Markov Model (HMM) recognizer that performs acoustic modeling of an audio signals and compares the HMM model to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The wakeword detection may also use a support vector machine (SVM) classifier that receives the one or more feature scores produced by the HMM recognizer. The SVM classifier produces a confidence score indicating the likelihood that an audio signal contains the trigger expression.

An action 510 comprises performing proximity detection to determine a distance of the user from the device 102. Proximity detection may be implemented using sound source localization (SSL) techniques in conjunction with a two-dimensional microphone array, as an example. Such SSL techniques analyze differences in arrival times of received sound at the respective microphones of a microphone array in order to determine the position from which the received sound originated. Alternatively, the device 102 may have cameras or specialized sensors for determining the position of a user relative to the device 102.

Any of the actions of the method 500 may produce items of the metadata 110. For example, the VAD 506 may produce a voice presence level, indicating the likelihood a person is speaking in the vicinity of the device 102. The VAD 506 may also produce a signal-to-noise measurement. The wakeword may produce a wakeword confidence level, corresponding to the likelihood that the user 104 has uttered the wakeword. The wakeword detection 508 may also produce a timestamp indicating the time at which the wakeword was detected. The proximity detection 512 may produce a distance parameter, indicating distance of the user 104 from the device 102.

An action 512 comprises sending the audio signal 108 and the metadata 110 to the speech service 112. The audio signal 108 may comprise one of the directional audio signals, such as the directional audio signal in which speech was detected and in which the wakeword was detected.

Figure 6:
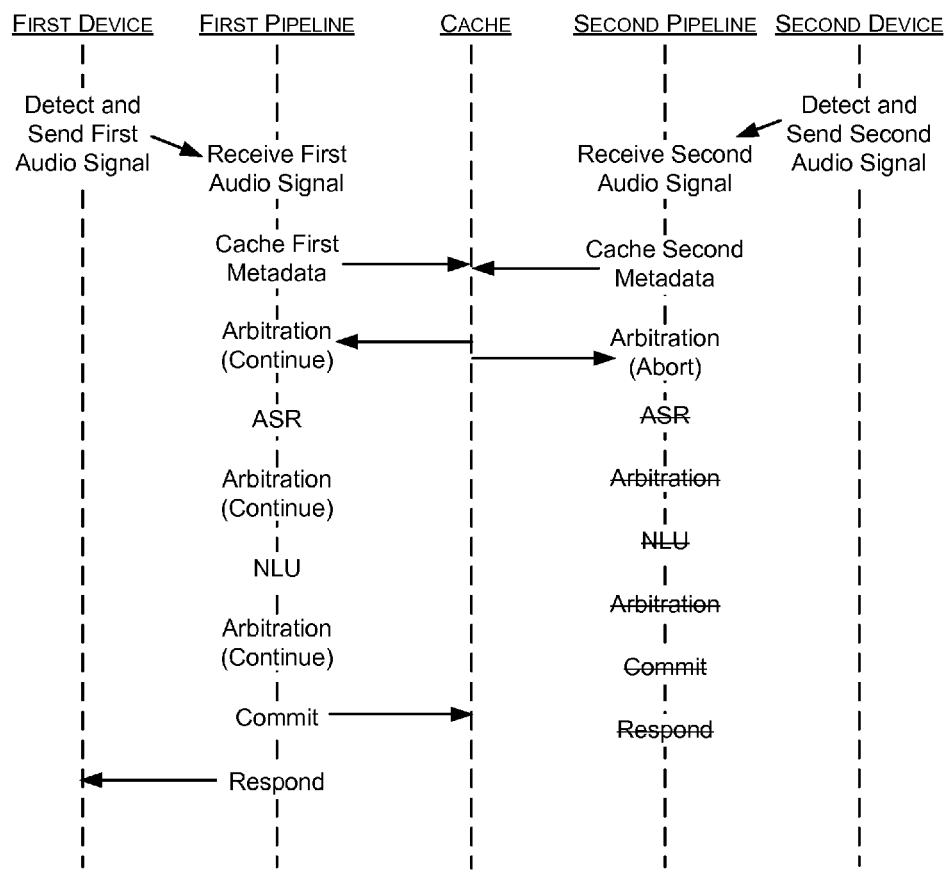
FIGS. 6-8 show examples of time sequences, from top to bottom, of actions that may result from different situations when processing audio signals from different speech interface devices in accordance with the method of FIG. 3.
Figure 7:
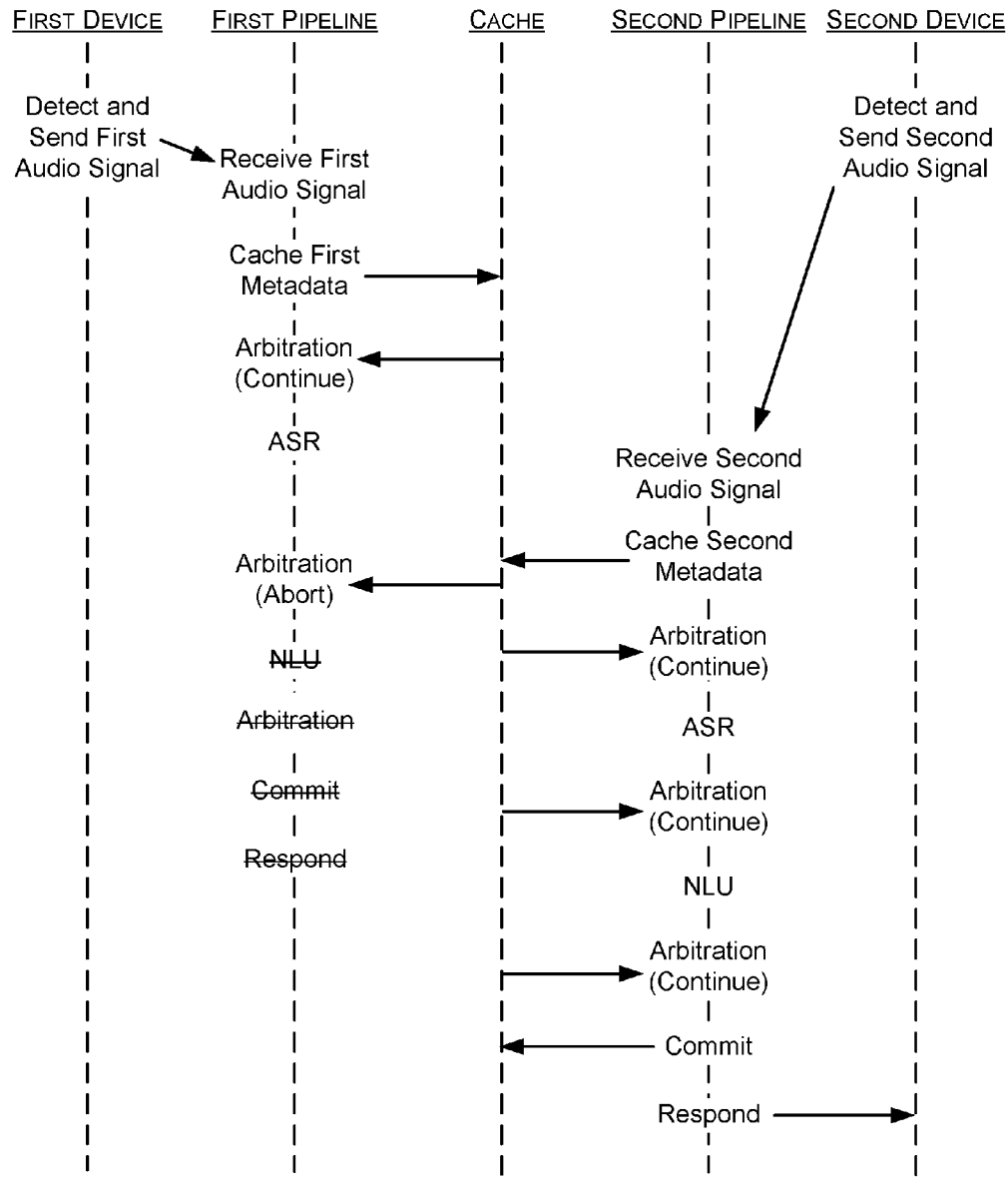
Figure 8:
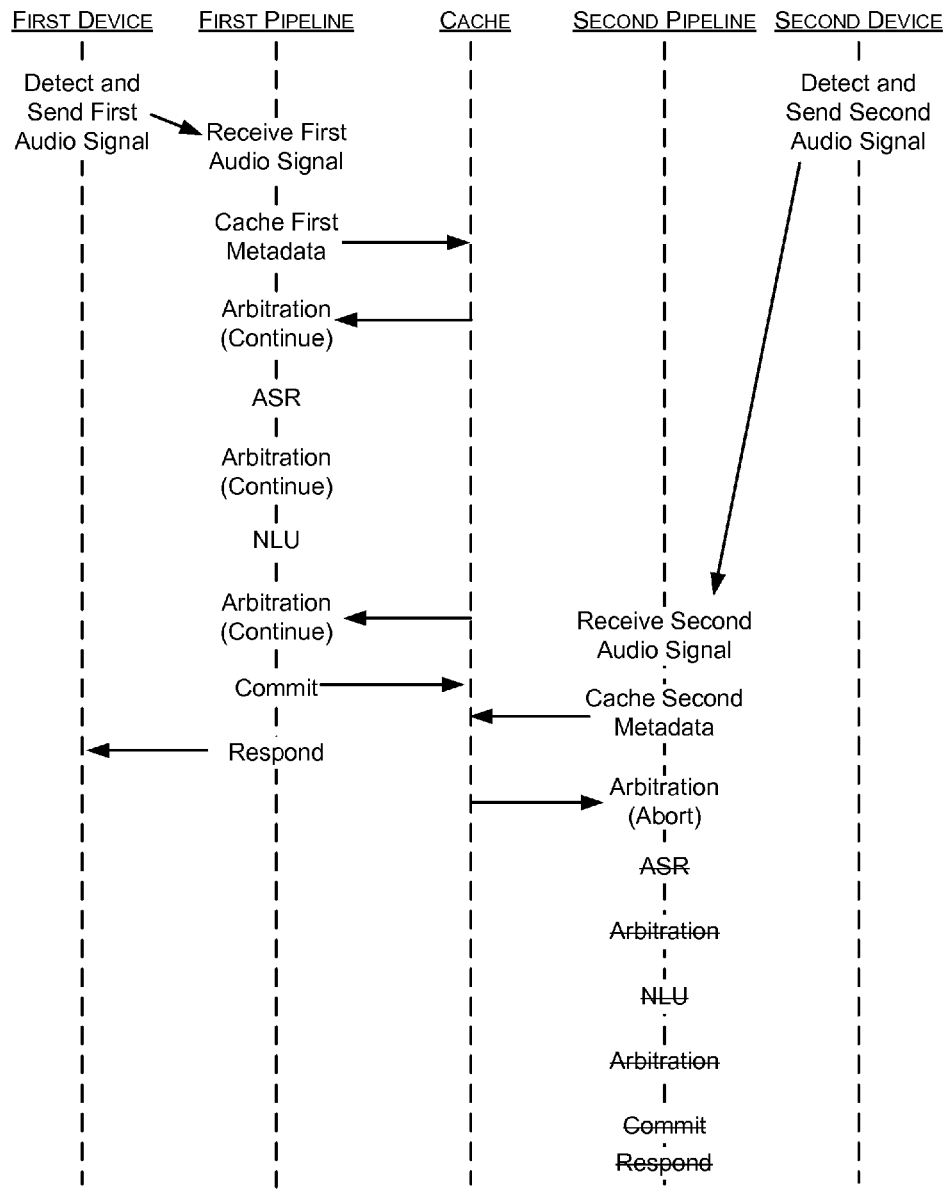

FIGS. 6-8 illustrate examples of how the described methods may result in one or the other of the devices 102(a) and 102(b) responding to the user request 106. In each of these figures, actions performed by a first device and an associated first pipeline instance are shown, as well as actions performed by a second device and an associated second pipeline instance, with actions shown in sequential order from top to bottom. Interactions with a centralized cache are also illustrated. Each example assumes that the audio signals provided by the first and second devices represent a common user utterance. That is, the action 408 determines by using the described techniques that the two audio signal most likely represent the same user utterance. In some embodiments, this may mean that a difference in the timestamps associated with the audio signals is smaller than a predefined threshold. The events shown in FIGS. 6-8 correspond generally to the actions shown in FIG. 3.

FIG. 6 represents a situation in which the audio signals are received at nearly the same time by the first and second pipeline instances. In this example, it is assumed that the audio signal provided by the first device has a higher metadata score than the audio signal provided by the second device. For example, the signal-to-noise ratio or the signal amplitude of the first audio signal may be higher than that of the second audio signal. Because the audio signals and accompanying metadata are received at nearly the same time, the first arbitration performed by the second pipeline instance is able to access cached metadata associated with the first audio signal and is able to determine that the first audio signal has a higher metadata score than the second audio signal. Based on this determination, the second pipeline instance aborts itself before initiating ASR, and the actions that are shown in strikethrough text are not performed. Rather, the first pipeline instance executes to completion and provides a response to the first device.

FIG. 7 represents a situation in which the second pipeline instance receives its audio signal significantly later than the first pipeline instance receives its audio signal. More specifically, the second pipeline instance receives its audio signal subsequent to the ASR component of the first pipeline instance analyzing its audio signal. FIG. 7 also assumes that the audio signal provided by the second device has a higher metadata score than the audio signal provided by the first audio device. In this case, the first arbitration performed by the first pipeline instance is not able to access any cached metadata regarding the second audio signal, because the second audio signal has not yet arrived. Rather, the second arbitration of the first pipeline instance is able to access the cached metadata associated with the second audio signal and at that point aborts the first pipeline instance. The second pipeline instance in this example continues to completion and provides a response to the second device.

FIG. 8 represents a situation in which the second pipeline instance receives its audio signal significantly later than the first pipeline instance receives its audio signal. In this case, the second pipeline instance receives the second audio signal after the first pipeline instance has already committed to responding to the user utterance. In this case, the first arbitration performed by the second pipeline instance determines that the first pipeline instance has already committed to responding to the user utterance and aborts itself before performing ASR, even if the second audio signal may have been associated with higher metadata scores than the first audio signal.

Figure 9:
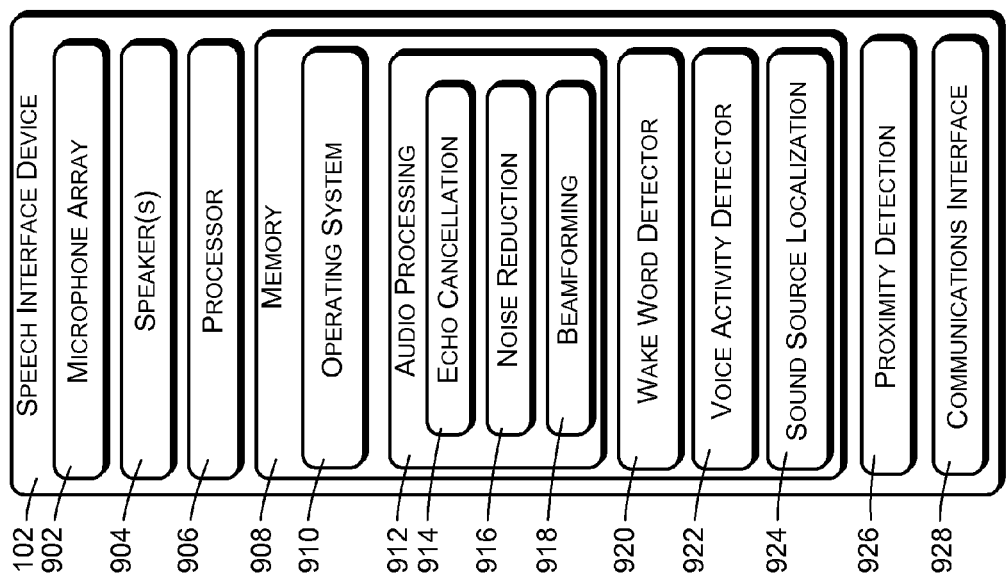
FIG. 9 is a block diagram showing relevant components of an example speech interface device.

FIG. 9 shows relevant components of an example speech interface device 102. The speech interface device 102 has a microphone array 902 and one or more audio loudspeakers 904 that facilitate audio interactions with the user 104. The microphone array 902 produces microphone audio signals representing audio from the environment of the speech interface device 102 such as sounds uttered by the user 104. The microphone audio signals produced by the microphone array 902 may comprise directional audio signals or may be used to produce directional audio signals, where each of the directional audio signals emphasizes audio from a different radial direction relative to the microphone array 902.

Although the speech interface device 102 is described as having one or more integral loudspeakers 904, in other embodiments the speech interface device 102 may not include loudspeaker. For example, the speech interface device 102 may comprise a microphone device into which a user speaks to issue commands or may comprise a device for connection to another appliance such as a television. Instead of an integrated loudspeaker, embodiments such as this may use loudspeaker capabilities of other devices, including other speech interface devices that do have loudspeakers and different types of dedicated loudspeaker components. As one example, the speech interface device 102 may produce an audio output signal that drives an external loudspeaker. As another example, the speech interface device 102 may drive or control an external loudspeaker through a wireless data connection such as a Bluetooth connection. In other situations, the speech interface device 102 may be used in conjunction with a loudspeaker device that receives audio signals and other instructions from the speech service 102, rather than from the speech interface device 102. In this case, the response 114 of FIG. 1 may be provided to such as loudspeaker device rather than to the speech interface device 102.

The speech interface device 102 may comprise a processing unit 906 and associated memory 908. The processing unit 906 may comprise one or more processors, which may include general-purpose processors, specialized processors, processing cores, digital signal processors, etc. Depending on the configuration of the speech interface device 102, the memory 908 may be a type of non-transitory computer storage media and may include volatile and nonvolatile memory. The memory 908 may include, but is not limited to, RAM, ROM, EEPROM, flash memory, or other memory technology. The memory 908 may include removable or detachable memory and may also include network-accessible memory. The memory 908 may include portable storage media such as a flash memory drive.

The memory 908 may be used to store any number of software components that are executable by the processing unit 906. Software components stored in the memory 908 may include an operating system 910 that is configured to manage hardware and services within and coupled to the speech interface device 102. In addition, executable components stored by the memory 908 may include audio processing components 912 configured to produce an audio signal using the microphone array 902. The audio processing components 912 may include functionality for processing microphone audio signals generated by the microphone array 902 and/or output audio signals provided to the loudspeaker 904. As an example, the audio processing components 912 may include an acoustic echo cancellation or suppression component 914 for reducing acoustic echo generated by acoustic coupling between the microphone array 902 and the loudspeaker 904. The audio processing components 912 may also include a noise reduction component 916 for reducing noise in received audio signals, such as elements of microphone audio signals other than user speech.

The audio processing components 912 may include one or more audio beamformers or beamforming components 916 configured to generate directional audio signals that are focused in different directions. More specifically, the beamforming components 916 may be responsive to audio signals from spatially separated microphone elements of the microphone array 902 to produce directional audio signals that emphasize sounds originating from different areas of the environment of the speech interface device 102 or from different directions relative to the speech interface device 102. The beamforming components 916 may in some cases produce metadata that may be used in arbitration. For example, the beamforming components 916 may indicate a signal strength of voice activity level corresponding to each directional audio signal.

Executable components stored in the memory 908 and executed by the processor 906 may include a wake word detection component 920 that monitors one or more of the directional audio signals to detect user utterances of the system of the trigger expression. As described above, wake-word detection may be implemented using keyword spotting technology, as an example. The wake word detection component 920 may produce metadata such as a confidence score or level, corresponding to the confidence with which the wake word was detected.

The software components may also include a voice activity detector 922 configured to monitor levels of voice presence in the directional audio signals produced by the beamforming component 918. Levels of voice presence may be used as metadata for purposes of arbitration as discussed above.

Software components of the device 102 may also include a sound source localization (SSL) component 924 that may be used to determine the distance of the user 104 from the device 102. The SSL component 924 is configured to analyze differences in arrival times of received sound at the respective microphones of the microphone array 902 in order to determine the position from which the received sound originated. For example, the SSL component 924 may use time-difference-of-arrival (TDOA) techniques to determine the position or direction of a sound source. The determined position may be used as metadata for purpose of performing arbitration as discussed above.

The device 102 may have a proximity detection component or system 926, such as a camera, a ranging device, or other sensor that is used to determine the position of the user 104 relative to the device 102. Again, position information produced in this manner may be used as metadata for purposes of arbitration.

The speech interface device 102 also has various hardware components, not shown, such as communication components, power components, I/O components, signal processing components indicators, control buttons, amplifiers, etc.

The speech interface device 102 may have a communications interface 928 such as a wireless or Wi-Fi network communications interface, an Ethernet communications interface, a cellular network communications interface, a Bluetooth communications interface, etc., for communications with the speech service 112 over various types of networks, including wide-area network, local-area networks, private networks, public networks etc. In the case of a wireless communications interfaces, such interfaces may include radio transceivers and associated control circuits and logic for implementing appropriate communication protocols.

Figure 10:
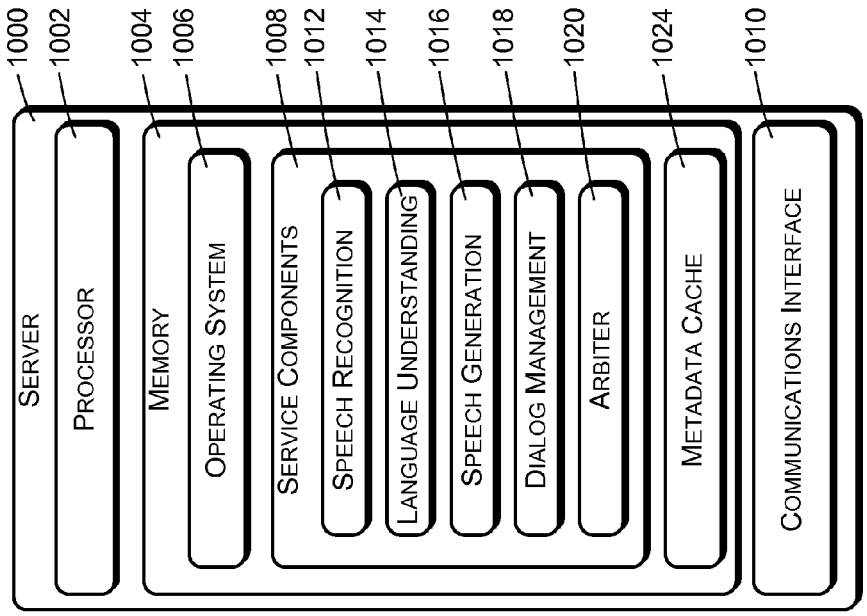
FIG. 10 is a block diagram showing relevant components of an example server that may be used in part to implement a speech service such as described herein.

FIG. 10 illustrates examples of relevant logical or functional components of a server 1000 that may be used to implement the speech service 112. Generally, the speech service 112 may be implemented by one or more servers 1000, with various functionality duplicated or distributed in various ways across the different servers. Servers may be located together or separately, and organized as virtual servers, server banks, and/or server farms. The functionality described herein may be provided by the servers of a single entity or enterprise, or may utilize the servers and/or services of multiple entities or enterprises. Furthermore, the described speech services may be part of a larger infrastructure that provides various types of functions and services to multiple users, not limited to the functions and services described herein.

In a very basic configuration, the example server 1000 may comprise a processing unit 1002 and associated memory 1004. The processing unit 1002 may comprise one or more processors, which may include general-purpose processors, specialized processors, processing cores, digital signal processors, etc. Depending on the configuration of the server 1000, the memory 1004 may be a type of non-transitory computer storage media and may include volatile and nonvolatile memory. The memory 1004 may include, but is not limited to, RAM, ROM, EEPROM, flash memory, or other memory technology. The memory 1004 may include removable or detachable memory and may also include network-accessible memory. The memory 1004 may include portable storage media such as a flash memory drive.

The memory 1004 may be used to store any number of software components that are executable by the processing unit 1002. Software components stored in the memory 1004 may include an operating system 1006 that is configured to manage hardware and services within and coupled to the server 1000. In addition, executable software components stored by the memory 1004 may include service components 1008 that support the speech-based operations of the speech interface device 102. The server 1000 may also have a communications interface 1010, such as an Ethernet communications adapter, for communicating with other servers 1000, other networked components, and with multiple speech interface devices 102, which may be located in the homes or other premises of many different users.

The components of the service components 1008 receive one or more audio signals that have been processed by the audio processing components 912 and perform various types of processing in order to understand the intent or meaning expressed by user speech. Generally, the speech components 1008 are configured to (a) receive a signal representing user speech, (b) analyze the signal to recognize the user speech, (c) analyze the user speech to determine a meaning of the user speech, and (d) generate output speech that is responsive to the meaning of the user speech.

The service components 1008 may include an automatic speech recognition (ASR) component 1012 that recognizes human speech in the received audio signal. The ASR component 1012 creates a transcript of words represented in the directional audio signals. The service components 1008 may also include a natural language understanding (NLU) component 1014 that is configured to determine user intent based on recognized speech of the user 104. The NLU component 1014 analyzes a word stream provided by the ASR component 1012 and produces a representation of a meaning of the word stream. For example, the NLU component 1014 may use a parser and associated grammar rules to analyze a sentence and to produce a representation of a meaning of the sentence in a formally defined language that conveys concepts in a way that is easily processed by a computer. The meaning may be semantically represented as a hierarchical set or frame of slots and slot values, where each slot corresponds to a semantically defined concept. NLU may also use statistical models and patterns generated from training data to leverage statistical dependencies between words in typical speech.

The service components 1008 may be implemented in part by a text-to-speech or speech generation component 1016 that converts text to audio for generation at the loudspeaker 904.

The service components 1008 may also include a dialog management component 1018 that is responsible for conducting speech dialogs with the user 104 in response to meanings of user speech determined by the NLU component 1014. The dialog management component 1018 may include domain logic that is used to analyze the meaning of user speech and to determine how to respond to the user speech. The dialog management component 1018 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The service components 1008 may include an arbiter component 1020 that determines whether a response should be provided to a received audio signal representing user speech, based at least in part on cached metadata regarding other audio signals as described above.

The service components 1008 may be used to form the speech processing pipeline instances 116 and for performing the method 300 of FIG. 3.

The memory 1004 may include a metadata cache 1024 in which metadata can be cached by multiple servers 1000 that implement different processing pipeline instances. In practice, the metadata cache may be implemented by a storage server that is accessible to multiple servers 1000 and multiple speech processing pipeline instances implemented by the servers 1000.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system, comprising;
  a first speech processing pipeline instance that receives a first audio signal from a first speech interface device, the first audio signal representing a speech utterance, the first speech processing pipeline instance also receiving a first timestamp indicating a first time at which a wakeword was detected by the first speech interface device;
  a second speech processing pipeline instance that receives a second audio signal from a second speech interface device, the second audio signal representing the speech utterance, the second speech processing pipeline also receiving a second timestamp indicating a second time at which the wakeword was detected by the second speech interface device;
  the first speech processing pipeline instance having a series of processing components comprising:
    an automatic speech recognition (ASR) component configured to analyze the first audio signal to determine words of the speech utterance;
    a natural language understanding (NLU) component positioned in the first speech processing pipeline instance after the ASR component, the NLU component being configured to analyze the words of the speech utterance to determine an intent expressed by the speech utterance;
    a response dispatcher positioned in the first speech pipeline instance after the NLU component, the response dispatcher being configured to specify a speech response to the speech utterance;

a first source arbiter positioned in the first speech processing pipeline instance before the ASR component, the first source arbiter being configured to determine (a) that an amount of time represented by a difference between the first timestamp and the second timestamp is less than a threshold; (b) to determine that the first timestamp is greater than the second timestamp; and (c) to abort the first speech processing pipeline instance.

2. The system of claim 1, wherein:
the first speech processing pipeline instance receives the first audio signal subsequent to the ASR component analyzing the first audio signal; and
the series of processing components comprises a second source arbiter positioned in the first speech processing pipeline instance after the ASR component, the second source arbiter being configured (a) to determine that the amount of time represented by the difference between the first timestamp and the second timestamp is less than the threshold; (b) to determine that the first timestamp is greater than the second timestamp; and (c) to abort the first speech processing pipeline instance.

3. The system of claim 1, the system being configured to send, to the first speech interface device, an indication that the first speech interface device will not respond to the utterance.

4. The system of claim 3, wherein the indication includes data causing the first speech interface device to stop providing the first audio signal to the first speech processing pipeline instance and to enter a listening mode in which the first speech interface device detects a further utterance of the wakeword.

5. The system of claim 1, wherein:
the first speech processing pipeline instance also receives a first signal attribute of the first audio signal, wherein the first signal attribute indicates one or more of:
a level of voice presence detected in the first audio signal;
a confidence with which a wakeword was detected by the first speech interface device;
an amplitude of the first audio signal;
a signal-to-noise measurement of the first audio signal; or
a distance of a user from the first speech interface device;
the second speech processing pipeline instance also receives a second signal attribute of the second audio signal, wherein the second signal attribute indicates one or more of:
a level of voice presence detected in the second audio signal;
a confidence with which the wakeword was detected by the second speech interface device;
an amplitude of the second audio signal;
a second signal-to-noise measurement of the second audio signal; or
a distance of the user from the second speech interface device; and
the first source arbiter is further configured to compare the first signal attribute to the second signal attribute to (a) determine that the user is more proximate the second user interface device than the first user interface device and (b) abort the first speech processing pipeline instance.

6. A method, comprising:
receiving, by a first speech processing pipeline, a first digital audio signal produced by a first device after the first device detects a wakeword, the first speech processing pipeline including a first series of speech processing components that process the first digital audio signal;
receiving, by a second speech processing pipeline, a second digital audio signal produced by a second device after the second device detects the wakeword, the second speech processing pipeline including a second series of speech processing components that process the second digital audio signal;
receiving one or more first attributes associated with the first digital audio signal;
receiving one or more second attributes associated with the second digital audio signal;
determining that the first digital audio signal represents an utterance;
determining that the second digital audio signal represents the utterance based at least in part on the first digital audio signal being received within a threshold amount of time of the second digital audio signal being received;
determining, based at least in part on the one or more first attributes and the one or more second attributes, that the first speech processing pipeline will process the first digital audio signal;
determining, based at least in part on the one or more first attributes and the one or more second attributes, that the first device will respond to the utterance; and
sending, to the first device, audio data representing a speech response to the utterance.

7. The method of claim 6, further comprising sending, to the first device, data that specifies speech to be produced by the first device.

8. The method of claim 7, further comprising sending, to the second device, data including an instruction that results in the first device entering a listening mode.

9. The method of claim 6, further comprising receiving configuration information indicating an association between the first device and the second device.

10. The method of claim 6, further comprising determining that the first device and the second device are associated with a user account.

11. The method of claim 6, further comprising:
performing automatic speech recognition (ASR) on the first digital audio signal to determine one or more words of the utterance;
performing natural language understanding (NLU) on the one or more words of the utterance to determine an intent expressed by the utterance.

12. The method of claim 6, wherein receiving the one or more first attributes comprises receiving a proximity of a user relative to the first device.

13. The method of claim 6, wherein determining that the first device will respond to the utterance comprises one or more of:
determining which of the first digital audio signal and the second digital audio signal has a higher amplitude;
determining which of the first device and the second device detects a higher level of voice presence;
determining which of the first digital audio signal and the second digital audio signal has a higher signal-to-noise measurement;
determining which of the first device and the second device detects a trigger expression with a higher level of confidence;
determining which of the first device and the second device first detects the trigger expression;

determining which of the first device and the second device has a capability;

determining within which of the first digital audio signal and the second digital audio signal words are recognized with a higher level of confidence; or determining within which of the first digital audio signal and the second digital audio signal an intent expressed by the words is determined with a higher level of confidence.

14. The method of claim 6, wherein determining that the first device will respond to the utterance comprises determining that a first time associated by the first device with the utterance is prior to second time associated by the second device with the utterance.

15. A system, comprising:
one or more processors;
one or more non-transitory computer-readable media storing computer-executable instructions that, when executed on the one or more processors, cause the one or more processors to perform actions comprising:
receiving, by a first speech processing pipeline, a first digital audio signal produced by a first device after the first device detects a wakeword, the first speech processing pipeline including a first series of speech processing components that process the first digital audio signal;
receiving, by a second speech processing pipeline, a second digital audio signal produced by a second device after the second device detects the wakeword, the second speech processing pipeline includes a second series of speech processing components that process the second digital audio signal;
receiving a first attribute associated with the first digital audio signal;
receiving a second attributed associated with the second digital audio signal;
determining that the first digital audio signal represents an utterance;
determining that the second digital audio signal represents the utterance based at least in part on the first digital audio signal being received within a threshold amount of time of the second digital audio signal being received;
determining, based at least in part on the one or more first attributes and the one or more second attributes, that the first speech processing pipeline will process the first digital audio signal;
determining, based at least in part on the first attribute and the second attribute, that the first device will respond to the utterance; and
sending, to the first device, audio data representing a speech response to the utterance.

16. The system of claim 15, wherein determining that the second digital audio signal represents the utterance comprises calculating a cross-correlation between the first digital audio signal and the second digital audio signal.

17. The system of claim 15, wherein determining that the second digital audio signal represents the utterance comprises determining that the first digital audio signal and the second digital audio signal represent matching sequences of words.

18. The system of claim 15, wherein determining that the second digital audio signal represents the utterance comprises:
determining that the first digital audio signal represents first user speech;
determining that the second digital audio signal represents second user speech; and
determining that the first user speech and the second user speech correspond to a common intent.

19. The system of claim 15, wherein the determining that the first device will respond to the utterance comprises one or more of:
determining which of the first device and the second device is physically nearer a user;
determining which of the first digital audio signal and the second digital audio signal has a higher signal amplitude;
determining which of the first digital audio signal and the second digital audio signal has a higher signal-to-noise measurement;
determining which of the first digital audio signal and the second digital audio signal represents a higher level of voice presence;
determining which of the first device and the second device first receives a response to the utterance; and
determining which of the first and second devices first receives the utterance.

* * * * *